United States Patent
Hattori et al.

(10) Patent No.: US 6,637,898 B2
(45) Date of Patent: Oct. 28, 2003

(54) MANUALLY FOLDABLE DOOR MIRROR (75) Inventors: Yasunori Hattori, Aichi (JP); Bunji Inagaki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/028,495

(22) Filed: Dec. 20, 2001

(65) Prior Publication Data

US 2002/0075577 A1 Jun. 20, 2002

(30) Foreign Application Priority Data

Dec. 20, 2000 (JP) ........................................ 2000-387268

(51) Int. Cl.[7] ................................................ G02B 5/08
(52) U.S. Cl. ........................................ 359/841; 248/900
(58) Field of Search ................................. 359/841, 872, 359/877; 248/900, 479

(56) References Cited

U.S. PATENT DOCUMENTS

| | | | | |
|---|---|---|---|---|
| 4,982,926 A | * | 1/1991 | Mori et al. ................ | 248/479 |
| 6,022,113 A | * | 2/2000 | Stolpe et al. ............... | 359/841 |
| 6,132,050 A | | 10/2000 | Sakata et al. .............. | 359/841 |
| 6,390,630 B1 | * | 5/2002 | Ochs ......................... | 359/841 |

FOREIGN PATENT DOCUMENTS

| | | |
|---|---|---|
| EP | 0711682 | 5/1996 |
| EP | 0807551 | 11/1997 |
| EP | 1129906 | 9/2001 |

* cited by examiner

*Primary Examiner*—Euncha Cherry
(74) *Attorney, Agent, or Firm*—Sheridan Ross PC (57) ABSTRACT

A manually foldable door mirror has a stand, a bracket which is supported by the stand, and a mirror portion which is fixed to the bracket. A first surface is formed on the stand. A support shaft extends from the stand. A first projection and a second projection are located on the first surface at a predetermined interval with respect to an axis of the support shaft. A second surface is formed on the bracket. A first recess and a second recess are located on the second surface at a predetermined interval with respect to the axis of the support shaft. When the first projection fits in the first recess and the second projection faces to the second recess, the mirror portion is held at the normal position. When the second projection fits in the first recess and the first projection faces to the second recess, the mirror portion is held at the folded position. A circumferential width of the second recess is greater than those of the first and second projections. A spring urges the bracket to the stand.

14 Claims, 6 Drawing Sheets

MANUALLY FOLDABLE DOOR MIRROR

BACKGROUND OF THE INVENTION

The present invention relates to a manually foldable door mirror provided on an automobile.

A typical manually foldable door mirror used in an automobile includes a mirror portion. The mirror portion rotates from the normal position to the folded position. The mirror portion is erected from the door at a predetermined angle in the normal position, and is folded toward the door in the folded position. The door mirror is formed such that when an operator moves the mirror portion to each position, the operator easily feels changes in the force applied to the mirror portion at the time the mirror portion starts moving from one of the normal position and the folded position and at the time the mirror portion reaches the other position. This feeling is referred to as a click stop feeling. The mirror portion is secured to a bracket. A stand is fixed to the door with a stay. The bracket is rotatably supported by a support shaft of the stand and is movable in the axial direction of the support shaft. A projection and a recess are provided between the stand and the bracket for determining the position of the stand and the bracket. The bracket is urged toward the stand by a spring.

Figure 8A:
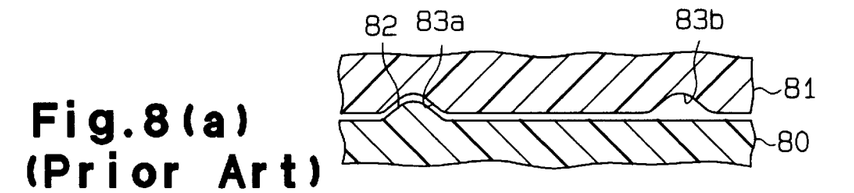
Figure 8B:
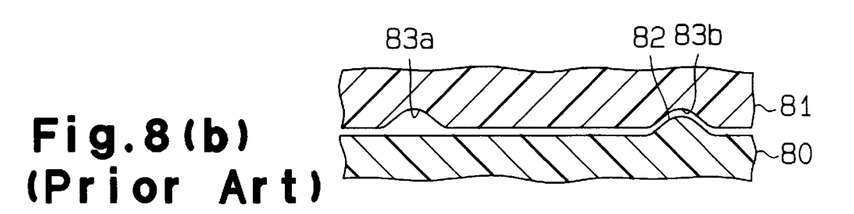

FIGS. 8(a) and 8(b) are exploded cross-sectional views of a contact portion between a conventional stand 80 and a bracket 81. A projection 82 is formed on the upper surface of the stand 80 along the circumferential portion about a support shaft, which is not shown. A first recess 83a and a second recess 83b are formed on the bottom surface of the bracket 81. The first recess 83a is fitted to the projection 82 when the mirror portion is at the normal position. The second recess 83b is fitted to the projection 82 when the mirror portion is at the folded position.

As shown in FIG. 8(a), when the mirror portion is being used, the projection 82 is fitted to the first recess 83a. When folding the mirror portion, an operator folds the mirror portion toward the vehicle body. Thus, the projection 82 is detached from the first recess 83a and then fitted to the second recess 83b as shown in FIG. 8(b). As a result, the mirror portion is retained in the folded position.

Typically, the angle between the mirror portion and the door when the door mirror is in the normal position differs depending on the car model. Therefore, the moving range of the mirror portion from the normal position to the folded position, that is, the folding angle, differs depending on the car model. Thus, a bracket having a recess that corresponds to the folding angle of each car model must be provided. Furthermore, the stand also has a different structure depending on the car model. In other words, the bracket and the stand are not shared between different car models. This increases the manufacturing cost.

SUMMARY OF THE INVENTION

The objective of the present invention is to provide a manually foldable door mirror that allows a bracket to be shared between different car models and allows an operator to easily feel a click stop feeling.

To attain the above object, the present invention provides a manually foldable door mirror. The door mirror has a stand which is fixed to a door of a vehicle, a bracket which is rotatably supported by the stand, and a mirror portion which is fixed to the bracket. The mirror portion moves from the normal position to the folded position. A first surface is formed on the stand. A support shaft extends from the stand. The support shaft supports the bracket. An axis of the support shaft is perpendicular to the first surface. A first projection and a second projection are located on the first surface at a predetermined interval with respect to the axis of the support shaft. A second surface is formed on the bracket. The second surface faces to the first surface. A first recess and a second recess are located on the second surface at a predetermined interval with respect to the axis of the support shaft. When the first projection fits in the first recess and the second projection faces to the second recess, the mirror portion is held at the normal position. When the second projection fits in the first recess and the first projection faces to the second recess, the mirror portion is held at the folded position. A circumferential width of the second recess is greater than those of the first and second projections. An urging member urges the bracket to the stand.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8(*a*) is an exploded cross-sectional view illustrating the normal state of a prior art door mirror; and FIG. 8(*b*) is an exploded cross-sectional view illustrating the folded state of the prior art door mirror.

DETAILED DESCRIPTION OF THE PREFERRED EMBODIMENTS

A manually folded door mirror 1 according to a preferred embodiment of the present invention will now be described with reference to FIGS. 1 to 7(*b*).

Figure 1:
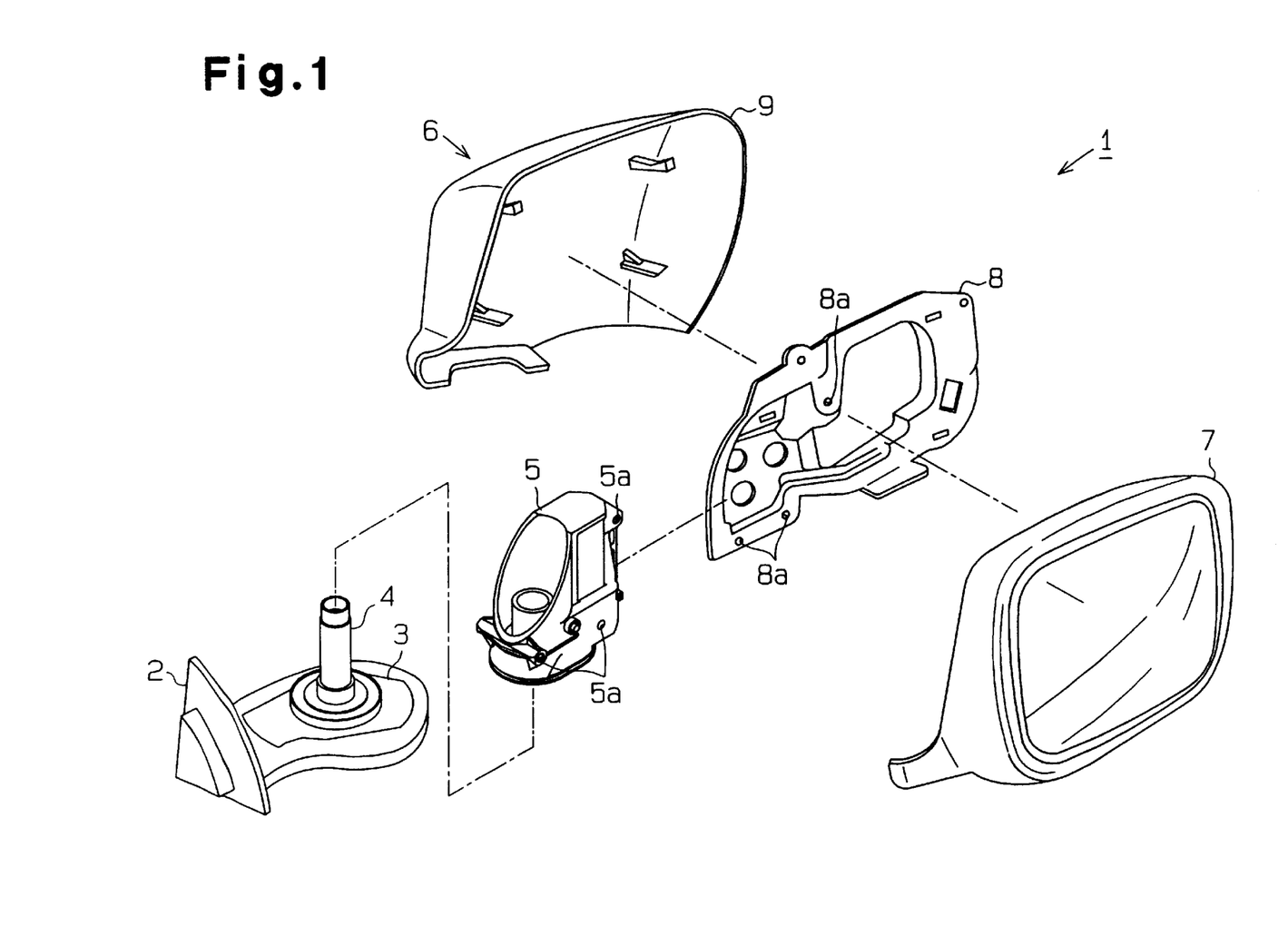
FIG. 1 is an exploded perspective view illustrating a manually foldable door mirror according to a preferred embodiment of the present invention.

As shown in FIG. 1, the manually folded door mirror 1 includes a metal stand 3, a resin bracket 5, and a mirror portion 6, which is fixed to the bracket 5. The stand 3 is fixed to a stay 2, which is provided on the door (not shown) of a vehicle. A support shaft 4 extends from the stand 3. The bracket 5 is rotatably supported by the support shaft 4 and is movable in the axial direction. The mirror portion 6 includes a mirror 7, a frame 8, and a visor cover 9.

Figure 3A:
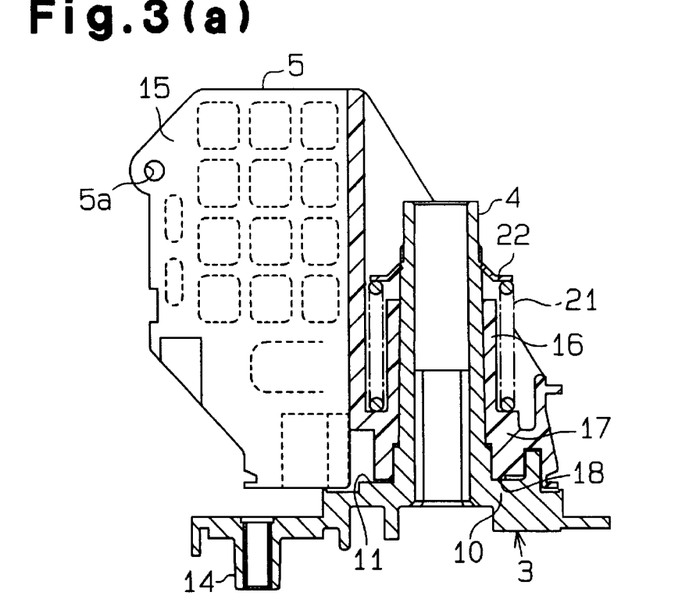
FIG. 3(a) is a cross-sectional view illustrating the bracket fitted to the stand.
Figure 3B:
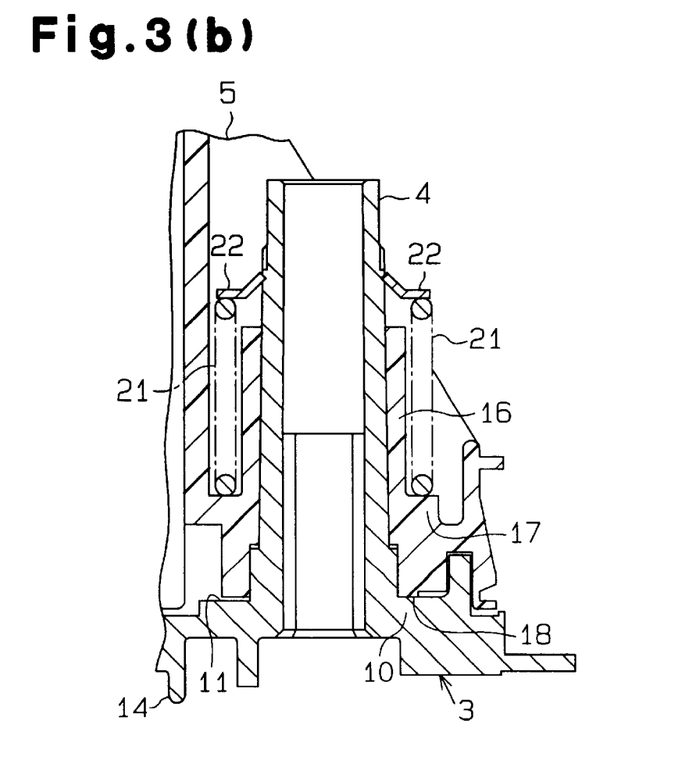
FIG. 3(b) is an enlarged partial cross-sectional view of the bracket and the stand shown in FIG. 3(a)
Figure 4A:
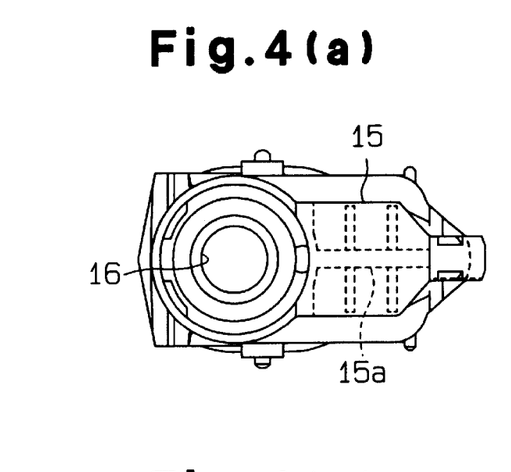
FIG. 4(a) is a top view showing the bracket of FIG. 1.
Figure 4B:
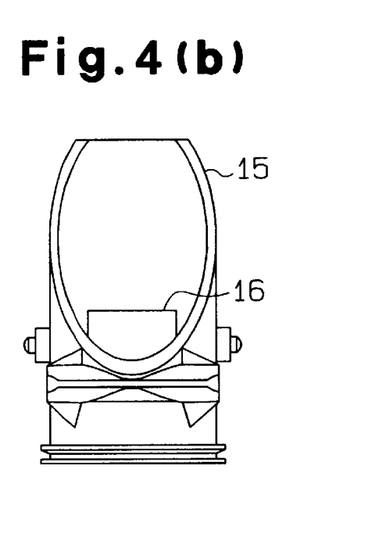
FIG. 4(b) is a left side view showing the bracket of FIG. 1.
Figure 4C:
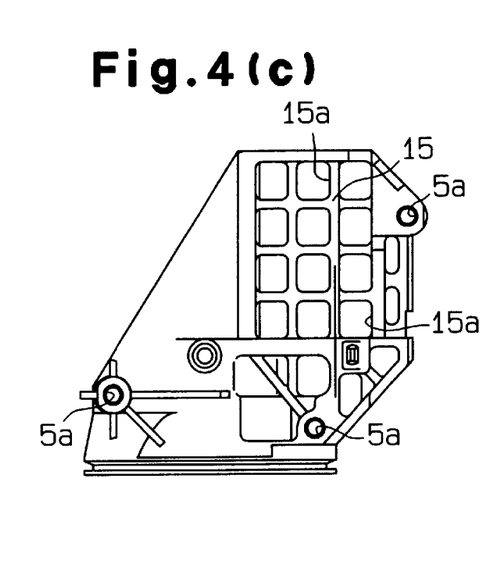
FIG. 4(c) is a front view showing the bracket of FIG. 1.
Figure 4D:
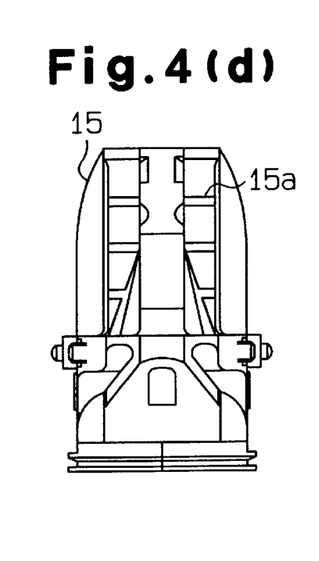
FIG. 4(d) is a right side view showing the bracket of FIG. 1.

As shown in FIGS. 3(*a*) and 3(*b*), the support shaft 4 is integrally formed with the stand 3. A first boss 10, which is coaxial with the support shaft 4, is formed on the lower end of the support shaft 4. The upper surface 11 of the first boss extends perpendicular to the axis of the support shaft 4 and abuts against the bracket 5.

Figure 2A:
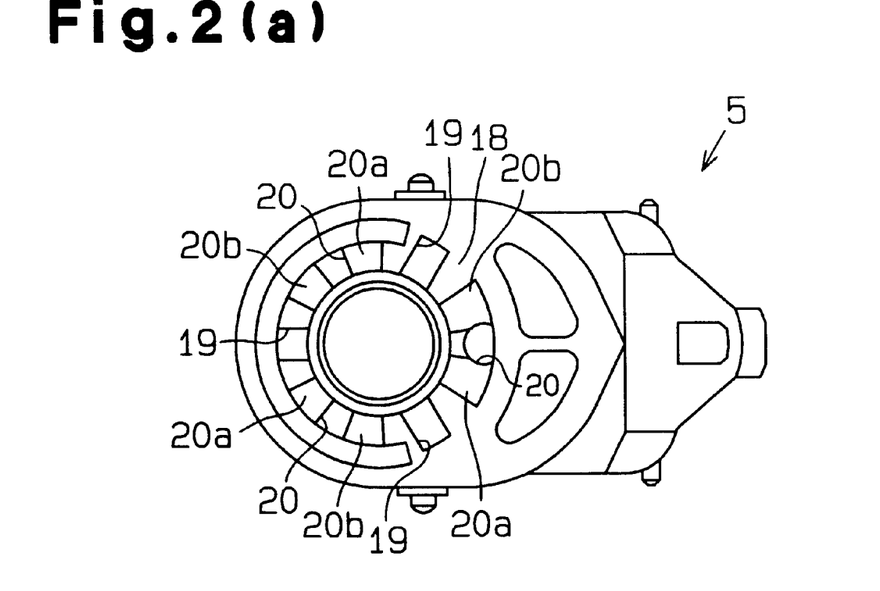
FIG. 2(a) is a bottom view illustrating the bracket of FIG. 1.
Figure 2B:
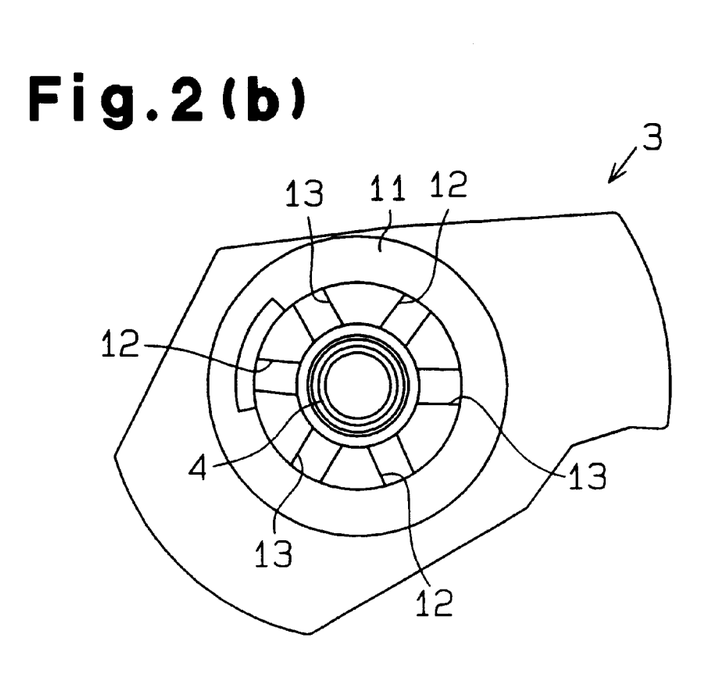
FIG. 2(b) is a plan view illustrating the stand of FIG. 1.
Figures 5A, 5B, 5C:
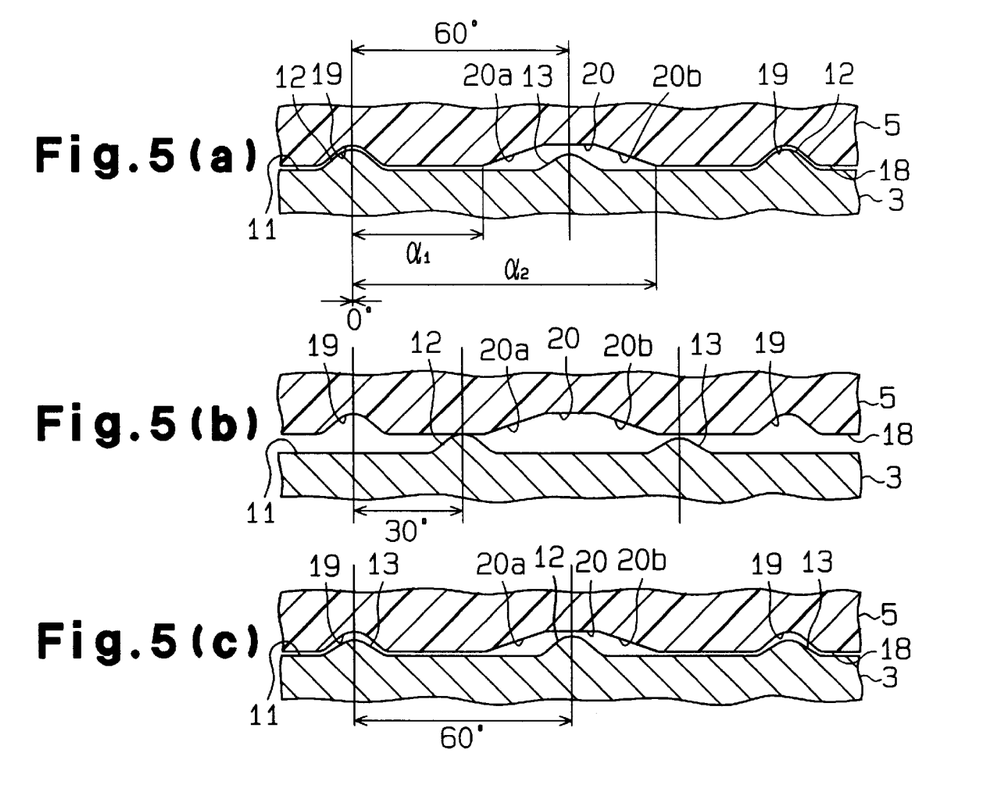
FIG. 5(a) is an exploded cross-sectional view illustrating the normal position of the bracket for a door mirror the folding angle of which is 60 degrees.
FIG. 5(b) is an exploded cross-sectional view illustrating a state, in which the bracket is rotated 30 degrees from the state shown in FIG. 5(a)
FIG. 5(c) is an exploded cross-sectional view illustrating the folded position, in which the bracket is rotated 60 degrees from the state shown in FIG. 5(a)

As shown in FIG. 2(*b*), three first projections 12 are located on the upper surface, or a first surface, 11 of the first boss 10 at equal angular intervals of 120 degrees. The first projections 12 extend radially outward from the support shaft 4. Second projections 13 are also located between the adjacent first projections 12 on the upper surface 11 of the first boss 10. Each of the second projections is spaced from the adjacent first projection 12 by 60 degrees. The length of each first projection 12 along the radial direction of the support shaft 4 is substantially the same as that of each second projection 13. The width of each first projection 12 along the circumferential direction of the support shaft 4 is substantially the same as that of each second projection 13. As shown in FIGS. 5(*a*), 5(*b*), and 5(*c*), the height of each second projection 13 from the upper surface 11 is less than that of each first projection 12. As shown in FIG. 3(*a*), a first support 14, which is engaged with the stay 2, is provided on the bottom surface of the stand 3.

As shown in FIGS. 4(*a*), 4(*b*), 4(*c*), and 4(*d*), the bracket 5 includes a second support 15 and a cylinder 16. The second support 15 secures the mirror portion 6. The support shaft 4 extends through the cylinder 16. As shown in FIGS. 3(*a*) and 3(*b*), a second boss 17 is formed on the lower end of the cylinder 16. A lower surface 18 of the second boss 17 extends perpendicular to the axis of the support shaft 4.

As shown in FIG. 4(*c*), the second support 15 is provided with three bores 5*a*. A screw is inserted through each bore 5*a* to secure the frame 8 to the second support 15. Three through holes 8*a* that correspond to the bores 5*a* of the bracket 5 are formed on the frame 8. Since the mirror portion 6 is secured to the bracket 5, the mirror portion 6 rotates about the support shaft 4 with the bracket 5. As shown in FIGS. 4(*a*), 4(*c*), and 4(*d*), the second support 15 is provided with a number of square recesses 15*a* facing the mirror portion 6 to minimize the weight.

As shown in FIG. 2(*a*), three first recesses 19 are formed on the lower surface, or a second surface, 18 of the second boss 17. The first recesses 19 extend radially outward from the support shaft 4 and are spaced at equal angular intervals of 120 degrees. Second recesses 20 are formed between the adjacent first recesses 19 on the lower surface 18 of the second boss 17. Each second recess 20 is spaced from the adjacent first recess 19 by 60 degrees. As shown in FIGS. 5(*a*), 5(*b*), 5(*c*), and 5(*d*), the second recesses 20 are longer than the first recesses 19 in the circumferential direction of the cylinder 16. A first inclined surface 20*a* is formed on one side of each second recess 20 and a second inclined surface 20*b* is formed on the other side of the second recess 20. The second recesses 20 are longer than the first and second projections 12, 13 in the circumferential direction of the cylinder 16. In other words, a circumferential width of the second recess is greater than those of the first and second projections. The first recess 19 includes a circumferential center, which is the middle point between one end and the other end of the first recess 19 along the circumferential direction of the cylinder 16.

The mirror portion 6 is retained in the normal position when the first projections 12 are fitted to the first recesses 19 and the second projections 13 are facing the second recesses 20. The mirror portion 6 is retained in the folded position when the first projections 12 are facing the second recesses 20 and the second projections 13 are fitted to the first recesses 19.

The bracket 5 according to the preferred embodiment is designed for a door mirror the folding angle of which is in the range of 50 to 70 degrees.

As shown in FIGS. 3(*a*) and 3(*b*), a stopper 22 is fitted to the upper circumferential portion of the support shaft 4. A spring 21 is provided between the upper surface of the second boss 17 and the stopper 22. The spring 21 urges the second boss 17 toward the first boss 10.

The operation of the door mirror 1 will now be described.

The mirror portion 6 is retained in the normal position when each first projection 12 is fitted to one of the first recesses 19 and each second projection 13 is facing one of the second recesses 20. The mirror portion 6 is retained in the folded position when each first projection 12 is facing one of the second recesses 20 and each second projection 13 is fitted to one of the first recesses 19.

FIGS. 5(*a*), 5(*b*), and 5(*c*) are exploded cross-sectional views illustrating the projections 12, 13 of the stand 3 and the recesses 19, 20 of the bracket 5 for a door mirror 1 the folding angle of which is 60 degrees. The stand 3 illustrated in FIG. 2(*b*) is for the door mirror 1 the folding angle of which is 60 degrees. In the FIGS. 5(*a*) to 5(*c*), a space is provided between the lower surface of the bracket 5 and the upper surface 11 of the stand 3. However, the lower surface of the bracket 5 and the upper surface 11 of the stand 3 actually contact each other in the normal position and the folded position. FIG. 5(*a*) illustrates the mirror portion 6 in the normal position. When the mirror portion 6 is rotated toward the folded position, the first projections 12 and the first recesses 19 are released. Then, the second projections 13 are detached from the second recesses 20. As shown in FIG. 5(*b*), for example, when the bracket 5 is rotated 30 degrees from the normal position toward the folded position, the first projections 12 are in contact with the lower surface 18. Therefore, the bracket 5 is lifted upward against the force of the spring 21. The bracket 5 is lifted by a distance equivalent to the height of the first projections 12. When the bracket 5 is further rotated 30 degrees from the state shown in FIG. 5(*b*), the first inclined surface 20*a* of each second recess 20 slides along the corresponding first projection 12. Then, each first projection 12 faces with the second recess 20 and each second projection 13 is engaged with the one of the first recesses 19 as shown in FIG. 5(*c*). FIG. 5(*c*) illustrates the bracket 5 retained in the folded position.

Figures 6A, 6B:
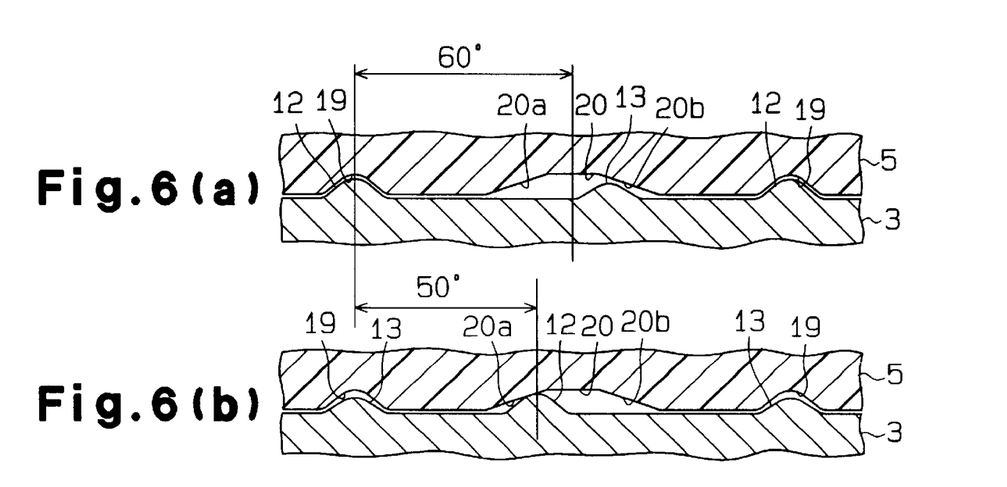
FIG. 6(a) is an exploded cross-sectional view illustrating the normal position of the bracket for a door mirror the folding angle of which is 50 degrees.
FIG. 6(b) is an exploded cross-sectional view illustrating the folded position of the bracket, in which the bracket is rotated 50 degrees from the state shown in FIG. 6(a)

FIGS. 6(*a*) and 6(*b*) are exploded cross-sectional views illustrating the projections 12, 13 of the stand 3 and the recesses 19, 20 of the bracket 5 for a door mirror 1 the folding angle of which is, for example, 50 degrees. In this case, the position of the second projections 13 of the stand 3 is different from that of the stand 3 illustrated in FIG. 5(a). As shown in FIG. 6(a), when the mirror portion 6 is in the normal position, each second projection 13 does not contact but faces the second inclined surface 20b of the corresponding second recess 20. FIG. 6(b) shows the state when the mirror portion 6 is rotated by 50 degrees from the normal position toward the folded position. In this state, each second projection 13 is fitted to the corresponding first recess 19 and each first projection 12 contacts the first inclined surface 20a of the corresponding second recess 20.

Figure 7A:
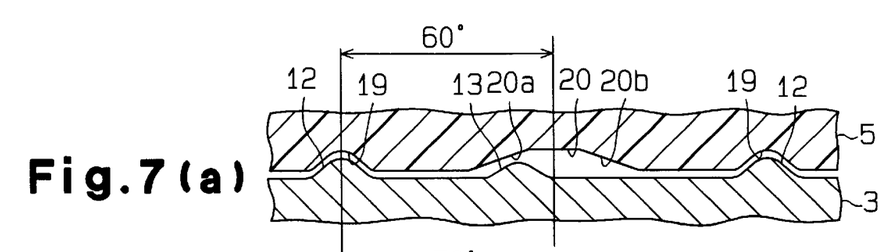
FIG. 7(a) is an exploded cross-sectional view illustrating the normal position of the bracket for a door mirror the folding angle of which is 70 degrees.
Figure 7B:
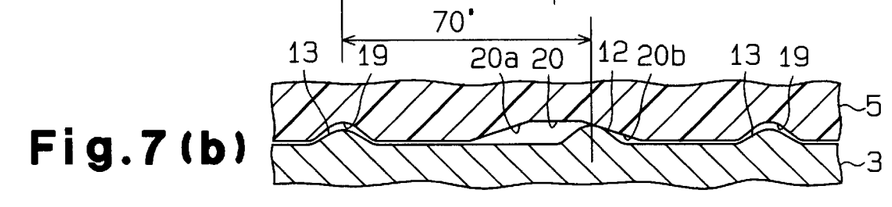
FIG. 7(b) is an exploded cross-sectional view illustrating the folded state, in which the bracket is rotated 70 degrees from the state shown in FIG. 7(a)

FIGS. 7(a) and 7(b) are exploded cross-sectional views illustrating the projections 12, 13 of the stand 3 and the recesses 19, 20 of the bracket 5 for a door mirror 1 the folding angle of which is, for example, 70 degrees. In this case, the position of the second projections 13 of the stand 3 is different from that of the stand 3 illustrated in FIG. 6(b). As shown in FIG. 7(a), when the mirror portion 6 is in the normal position, each second projection 13 does not contact but faces the first inclined surface 20a of the corresponding second recess 20. FIG. 7(b) shows the door mirror 6, which is rotated by 70 degrees from the normal position shown in FIG. 7(a) toward the folded position. In this state, each second projection 13 is fitted to the corresponding first recess 19 and each first projection 12 contacts the second inclined surface 20b of the corresponding second recess 20.

As shown in FIGS. 5(a), 5(b), 5(c), 6(a), 6(b), 7(a), and 7(b), even when the folding angle differs, the bracket 5 need not be changed. The bracket 5 is set in the normal position of the door mirror 1 when each first projection 12 is fitted to the corresponding first recess 19. The bracket 5 is set in the folded position when each second projection 13 is fitted to the corresponding first recess 19.

An assembling procedure of the door mirror 1 will now be described. First, the support shaft 4, which is provided on the stand 3, is inserted into the cylinder 16 of the bracket 5. The bracket 5 is rotatably supported by the stand 3. Then, the spring 21 is arranged on the upper surface of the second boss 17 to surround the cylinder 16. Subsequently, the stopper 22, which holds the spring 21, is fitted to the support shaft 4. The spring 21 urges the second boss 17, which in turn urges the lower surface 18 of the second boss 17 toward the upper surface 11 of the first boss 10.

The screws are secured to the bores 5a through the through holes 8a of the frame 8. This secures the mirror portion 6 to the bracket 5. The mirror 7 is fitted to the visor cover 9. The frame 8 is held between the mirror 7 and the visor cover 9. After the stand 3, the bracket 5, and the mirror 6 are assembled, the stand 3 is secured to the stay 2 by the first support 14.

The present embodiment provides the following advantages.

The door mirror 6 is held in the normal position when each first projection 12 is fitted to the corresponding first recess 19. The door mirror 6 is held in the folded position when each second projection 13 is fitted to the corresponding first recess 19. Furthermore, when each first projection 12 faces the corresponding second recess 20, a space is provided between the first projection 12 and the second recess 20. Therefore, the same bracket 5 is used for car models having different folding angles. Thus, it is not required to manufacture the bracket 5 for each car model and the manufacturing cost is reduced.

Either of the first projections 12 and the second projections 13 are fitted to the first recesses 19. Therefore, when an operator moves the mirror portion 6 from the normal position to the folded position, the operator easily feels the change in the force applied to the mirror portion 6.

The first and the second inclined surfaces 20a, 20b are formed on the circumferential ends of each second recess 20. Therefore, the force required to detach the first projections 12 or the second projections 13 from the second recess 20 is less than the force required to detach the first projections 12 or the second projections 13 from the first recesses 19.

The height of the second projections 13 is less than that of the first projections 12. Therefore, the force required to detach the second projections 13 from the first recesses 19 when rotating the mirror portion 6 from the folded position to the normal position is less than the force required to detach the first projections 12 from the first recesses 19 when rotating the mirror portion 6 from the normal position to the folded position.

The width of the second projections 13 along the circumferential direction of the support shaft 4, is the same as that of the first projections 12. Therefore, the mirror portion 6 is held in the folded position when the second projections 13 are fitted to the first recesses 19.

The first and the second inclined surfaces 20a, 20b are provided on the circumferential ends of each second recess 20. Therefore, if the folding angle is large, the first projections 12 contact the second inclined surfaces 20b when the mirror portion 6 is rotated from the normal position to the folded position. Therefore, the force that is applied to the mirror portion 6 in the folded position increases. Also, if the folding angle is small, when the mirror portion 6 is moved from the normal position to the folded position, each first projection 12 contacts the corresponding first inclined surface 20a. Therefore, click stop feeling at the normal position is clear.

The mirror portion 6 has the multiple projections 12, 13 and the multiple recesses 19, 20. Therefore, in comparison to a mirror portion having only one projection and one recess, the mirror portion 6 is more reliably held in the normal position and the folded position.

The projections 12, 13 and the recesses 19, 20 are provided at equal angular intervals. Therefore, when moving the mirror portion 6 between the normal position and the folded position, the bracket 5 is rotated in a stable manner and without inclining.

The present invention is not restricted to the illustrated embodiment and may be modified as follows.

The number of projections 12, 13 and the number of the recesses 19, 20 need not be three. The projections 12, 13 and the recesses 19, 20 may be formed one or more each.

The first projections 12 and the second projections 13 may be formed into the same size. In this case, the holding force of the door mirror 1 in the folded position increases.

In the preferred embodiment, the first projections 12 and the second projections 13 are formed substantially semi-spherical. However, the projections 12, 13 may be formed triangular or trapezoidal and the recesses 19, 20 may be formed accordingly.

The cross-section of the second recesses 20 may be arcuate.

As shown in FIG. 5(a), a circumferential angle between the circumferential center of the first recess 19 and the closest circumferential end of the second recess 20 about the axis of the support shaft 4 is defined as an angle $\alpha_1$. The circumferential angle between the circumferential center of the first recess 19 and the other circumferential end of the second recess 20 is defined as an angle $\alpha_2$. To provide a bracket that is applicable to several folding angles (30° to 90°) used for vehicles, it is preferable to set the angle $\alpha_1$ greater than or equal to 30 degrees and to set the angle $\alpha_2$ less than or equal to 90 degrees. However, the door mirrors rarely have the folding angle of 90 degrees or 30 degrees. Therefore, it is preferable to set the angle $\alpha_1$ greater than or equal to 40 degrees and to set the angle $\alpha_2$ less than or equal to 70 degrees.

The spring 21 urges the bracket 5 toward the stand 3. Therefore, even when the first and second projections 12, 13 provided on the stand 3 are not fitted to the first and second recesses 19, 20 provided on the bracket 5, the stand 3 and the bracket 5 are retained by the force of the spring 21. Since the mirror portion 6 is not retained in the folded position while a vehicle is running, the stand 3 and the bracket 5 need not be retained by the recesses and the projections fitted to each other. Thus, as shown in FIG. 7(b), in a case when the first projections 12 contact the second inclined surfaces 20b while the mirror portion 6 is retained in the folded position, the second projections 13 need not be formed on the stand 3. Since each first projection 12 contacts the corresponding second inclined surface 20b, the operator feels a click stop feeling without the second projections 13.

Therefore, the present examples and embodiments are to be considered as illustrative and not restrictive and the invention is not to be limited to the details given herein, but may be modified within the scope and equivalence of the appended claims.

What is claimed is:

1. A manually foldable door mirror having a stand which is fixed to a door of a vehicle, a bracket which is rotatably supported by the stand, and a mirror portion which is fixed to the bracket, wherein the mirror portion moves from the normal position to the folded position, the door mirror comprising:

a first surface formed on the stand, wherein a support shaft extends from the stand, wherein the support shaft supports the bracket, wherein an axis of the support shaft is perpendicular to the first surface, wherein a first projection and a second projection are located on the first surface at a predetermined interval with respect to the axis of the support shaft;

a second surface formed on the bracket, wherein the second surface faces to the first surface, wherein a first recess and a second recess are located on the second surface at a predetermined interval with respect to the axis of the support shaft, wherein, when the first projection fits in the first recess and the second projection faces to the second recess, the mirror portion is held at the normal position and wherein, when the second projection fits in the first recess and the first projection faces to the second recess, the mirror portion is held at the folded position, wherein a circumferential width of the second recess is greater than those of the first and second projections; and an urging member for urging the bracket to the stand.

2. The door mirror according to claim 1, wherein the first recess and the second recess are formed such that a circumferential angle formed by a circumferential center of the first recess and a closest circumferential end of the second recess is equal to or greater than thirty degrees, and a circumferential angle formed by the circumferential center of the first recess and the other circumferential end of the second recess is equal to or less than ninety degrees, and wherein the circumferential angle formed by the circumferential center of the first recess and the closest circumferential end of the second recess is less than the circumferential angle formed by the circumferential center of the first recess and the other circumferential end of the second recess.

3. The door mirror according to claim 1, wherein the first recess and the second recess are formed such that a circumferential angle formed by a circumferential center of the first recess and a closest circumferential end of the second recess is equal to or greater than forty degrees, and a circumferential angle formed by the circumferential center of the first recess and the other circumferential end of the second recess is equal to or less than seventy degrees, and wherein the circumferential angle formed by the circumferential center of the first recess and the closest circumferential end of the second recess is less than the circumferential angle formed by the circumferential center of the first recess and the other circumferential end of the second recess.

4. The door mirror according to claim 1, wherein an inclined surface is formed on both ends of the second recess, wherein the inclined surface inclines to the second surface.

5. The door mirror according to claim 1, wherein the first projection, the second projection, the first recess and the second recess are one of a plurality of the first projections, the second projections, the first recesses and the second recesses, respectively.

6. The door mirror according to claim 1, wherein the first and second projections are the same size.

7. The door mirror according to claim 1, wherein the height of the second projection is smaller than that of the first projection.

8. A manually foldable door mirror having a stand which is fixed to a door of a vehicle, a bracket which is rotatably supported by the stand, and a mirror portion which is fixed to the bracket, wherein the mirror portion moves from the normal position to the folded position, the door mirror comprising:

a first surface formed on the stand, wherein a support shaft extends from the stand, wherein the support shaft supports the bracket, wherein an axis of the support shaft is perpendicular to the first surface, wherein a plurality of first projections are formed on the first surface, wherein the first projections are located at a predetermined interval with respect to the axis of the support shaft, wherein a plurality of second projections are formed on the first surface, wherein the second projections are located at a predetermined interval with respect to the axis of the support shaft, wherein each second projection is located between the adjacent first projections;

a second surface formed on the bracket, wherein the second surface faces to the first surface, wherein a plurality of first recesses are formed on the second surface, wherein the second recesses are located at a predetermined interval with respect to the axis of the support shaft, wherein the second recess is located between the adjacent first recesses, wherein, when the first projection fits in the first recess and the second projection faces to the second recess, the mirror portion is held at the normal position, wherein, when the second projection fits in the first recess and the first projection faces to the second recess, the mirror portion is held at the folded position, wherein a circumferential width of the second recess is greater than those of the first and second projections; and an urging member for urging the bracket to the stand.

9. The door mirror according to claim 8, wherein each first recess and one of the adjacent second recesses are formed such that a circumferential angle formed by a circumferential center of the first recess and a closest circumferential end of the second recess is equal to or greater than thirty degrees, and a circumferential angle that the angle formed by the circumferential center of the first recess and the farther circumferential end of the second recess is equal to or less than ninety degrees, and wherein the circumferential angle formed by the circumferential center of the first recess and the closest circumferential end of the second recess is less than the circumferential angle formed by the circumferential center of the first recess and the other circumferential end of the second recess.

10. The door mirror according to claim 8, wherein each first recess and one of the adjacent second recesses are formed such that a circumferential angle formed by a circumferential center of the first recess and a closest circumferential end of the second recess is equal to or greater than forty degrees, and a circumferential angle that the angle formed by the circumferential center of the first recess and the farther circumferential end of the second recess is equal to or less than seventy degrees, and wherein the circumferential angle formed by the circumferential center of the first recess and the closest circumferential end of the second recess is less than the circumferential angle formed by the circumferential center of the first recess and the other circumferential end of the second recess.

11. The door mirror according to claim 8, wherein the first and second projections are the same size.

12. The door mirror according to claim 8, wherein the height of the second projection is smaller than that of the first projection.

13. The door mirror according to claim 1, wherein the projections are disengaged and realigned with the recesses when the mirror portion is held at the folded position.

14. The door mirror according to claim 8, wherein the projections are disengaged and realigned with the recesses when the mirror portion is held at the folded position.

* * * * *